H. K. MOORE & R. B. WOLF.
RECLAIMING WASTE PRODUCTS IN THE MANUFACTURE OF SULFITE FIBER.
APPLICATION FILED NOV. 1, 1910.
1,103,216.
Patented July 14, 1914.
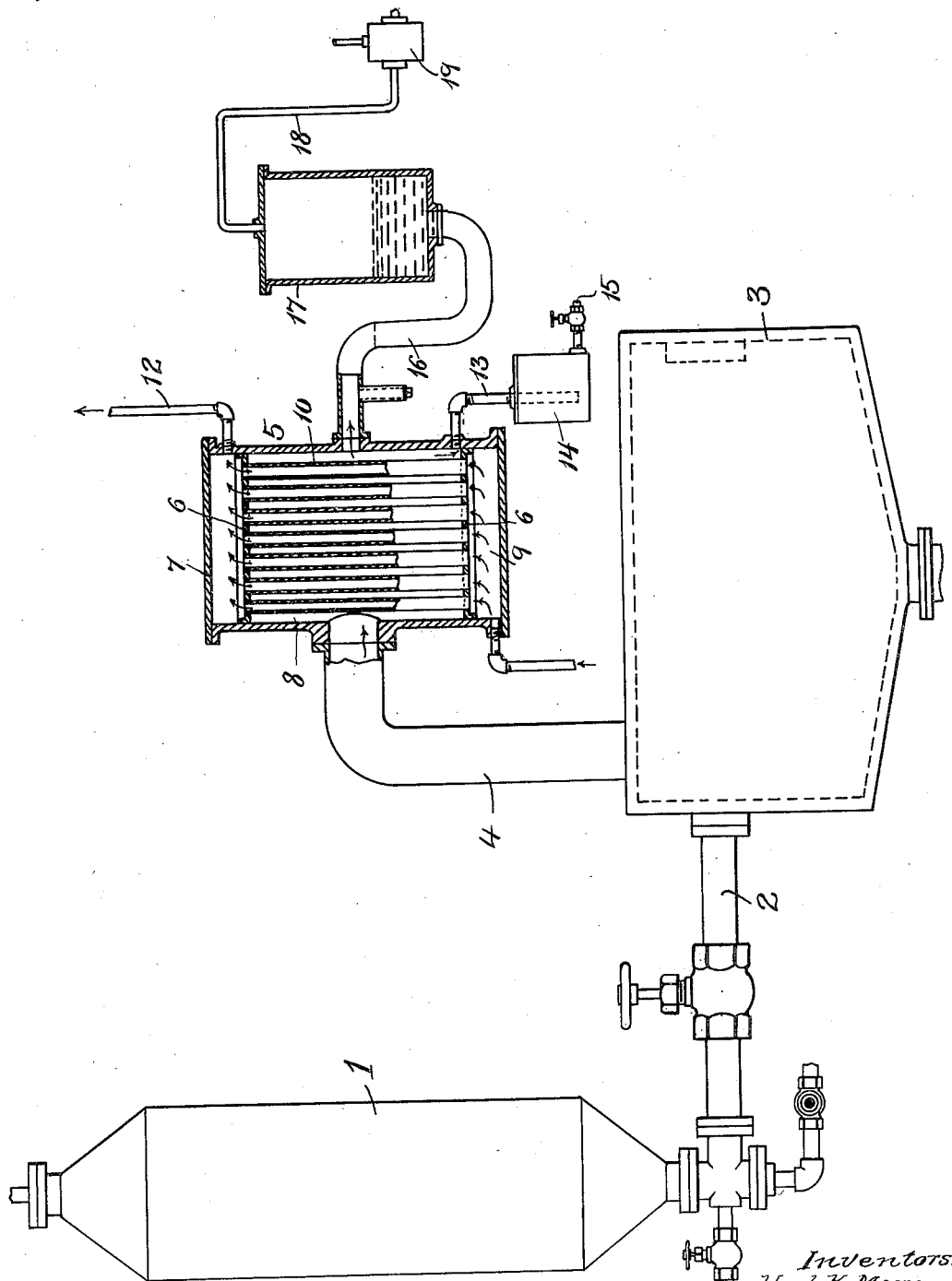

UNITED STATES PATENT OFFICE.

HUGH K. MOORE AND ROBERT B. WOLF, OF BERLIN, NEW HAMPSHIRE.

RECLAIMING WASTE PRODUCTS IN THE MANUFACTURE OF SULFITE FIBER.

1,103,216. Specification of Letters Patent. Patented July 14, 1914.

Application filed November 1, 1910. Serial No. 590,158.

*To all whom it may concern:*

Be it known that we, HUGH K. MOORE and ROBERT B. WOLF, of Berlin, in the county of Coos and State of New Hampshire, have invented certain new and useful Improvements in Reclaiming Waste Products in the Manufacture of Sulfite Fiber, of which the following is a specification.

In the manufacture of sulfite fiber in which the ground or chipped wood is treated with acid to dissolve the lignin and cementitious materials of the wood and free the cellulose fiber, it has generally been customary, after the cooking operation to "blow" the digester, or discharge the contents thereof into a blow pit equipped with a "vomit stack" so called, which permits the escape of the vapor and gases. These vapors and gases compose free sulfur dioxid, water, wood alcohol, benzaldehyde, acetone, acetic acid and various by-products, all of which heretofore escaped into the atmosphere.

The object of the present invention is the reclamation of some of the waste products which have heretofore been discharged with the vapor or steam from the blow pit.

In carrying out our invention, we conduct the vapors arising from the pit into contact with a chilled solid body to condense the water vapor and those other vapors which will condense at slightly less than the boiling point of water, and thereby to separate them from sulfur dioxid and such waste inert gases as may be discharged. The sulfur dioxid is then recovered in suitable form for reuse. The products of condensation are collected, and may be further treated for the recovery of valuable by-products therein contained. By withdrawing these products of condensation from the surface condenser at approximately the boiling point of water, the absorption thereby of sulfur dioxid is materially prevented.

On the accompanying drawing, we have illustrated certain of the instrumentalities which may be utilized in carrying out our process.

The digester is illustrated at 1 and is of the type used in the manufacture of sulfite fiber. In it are placed the chips and the acid, and, after the neck is sealed, steam is injected into the digester to bring the contents thereof to the proper temperature. If desired, sulfur dioxid may be injected into the digester in accordance with the process described in our application Serial No. 451,246, filed February 1, 1910. After the wood has been cooked at the proper temperature for the proper length of time and the cellulose fibers have been freed from their cementing materials, the contents of the digester are blown in the usual way through the pipe 2 into a blow pit which is conventionally illustrated at 3 but which is constructed as ordinarily with the false bottom, not shown, for permitting the escape of the waste liquors. As usual, the interior of the blow pit is at slightly less than atmospheric pressure. Hence when the contents of a digester of ordinary size are discharged into the blow pit, at a steam pressure of say from 45 to 75 pounds per square inch (not including the pressure due to the static head), from 18,000 to 20,000 pounds of steam are liberated in the blow pit from the discharged water. The temperature of the contents of the digester varies from 250° F. to 320° F., and, as soon as the materials reach the blow pit, vapors arise therefrom and are conducted away through the vomit stack 4. Heretofore in actual practice these stacks have always opened into the atmosphere into which the rising vapors escape and become dissipated. In addition to the vapors, there has been heretofore an escape of a certain amount of free sulfur dioxid which was not utilized in the cooking operation. In accordance with our process, the vomit stack is closed to the atmosphere and the vapors and gases are conducted to a surface condenser conventionally illustrated at 5. The surface condenser may be of any suitable or desired type. As illustrated, it is provided with diaphragms 6 6 forming compartments 7, 8, and 9, the compartments 7 and 9 communicating through tubes 10 passed through the chamber 8. As shown, the vomit stack discharges into the compartment 8 and the gases and vapors are caused to circulate around the tubes. Cold water or any other suitable cooling medium is introduced through a pipe 11 to the chamber 7, and, passing through the tubes to the chamber 9, is discharged through the circulating pipe 12. The vapors, entering the condenser from the vomit stack, are condensed and pass therefrom by a pipe 13 to a receptacle 14 from which they may be drawn by the valved discharge pipe 15. Ordinarily we employ water for the cooling medium at its seasonable temperatures, although in lieu thereof a chilled cooling medium might be utilized, or the water itself might be cooled prior to its admission to the condenser.

The effect of condensation of the vapors is to reduce to liquid form the water vapor and such compounds as wood alcohol, benzaldehyde, acetone, acetic acid, and other vapors which would condense at, or slightly above the temperature of the cooling medium, the quantities, amounts and character of these compounds depend more or less upon methods, temperature, etc., used in cooking as well as the nature of materials cooked. The application of the principle of recovering these compounds by condensing vapors from blowing digesters, while herein described as applying to the sulfite process may also be applied to any other process such as the so called sulfate and soda process.

The condensation of the water vapor to water permits the absorption by the water of only a certain relatively small portion of the free sulfur dioxid gas which escapes with the vapor. The remaining large volume of $SO_2$ is conducted from the condenser by means of the trapped pipe 16, through a tank or receptacle 17 which contains a body of suitable absorbent such as sodium hydrate (NaOH), calcium hydrate ($CaO_2H_2$), etc. To the upper end of the receptacle is connected an exhaust pipe 18 leading to a vacuum pump indicated at 19. The unabsorbed sulfur dioxid, leaving the condenser, is drawn by the vacuum apparatus into the absorber 16 where it is wholly absorbed by the sodium hydrate or other absorbent material.

The product of the condensation, which is collected in the tank 14 may be neutralized with calcium hydroxid $Ca(OH)_2$. This has the effect of precipitating the $SO_2$ in the form of calcium sulfite ($CaSO_3$) which is removed by passing the materials through a filter press, leaving the filtrate practically clear and neutral. The filtrate contains acetic acid in the form of a lime or other salt, methyl alcohol, benzaldehyde, acetone and other organic acid salts and compounds which may be separated and removed by any of the well known processes. The absorbent in the tank 17, after it has absorbed to its full capacity the sulfur dioxid gas, may be used in making the bisulfite which is used in the digesters in cooking the wood.

In our previous application, hereinbefore identified, we have described a process of reclaiming the sulfur dioxide and other waste products discharged from the relief valves from the digester. The present invention provides for completely reclaiming the sulfur dioxid which heretofore has been lost in the operation of blowing the digesters into the blow pits. In addition to reclaiming the sulfur dioxid, so that it may be again utilized, the present invention provides for reclaiming and utilizing valuable products such as methyl alcohol, benzaldehyde, acetone, acetic acid and other organic acids and compounds. It is desirable that the products of condensation should be as free as possible of surfur dioxid.

We have stated herein that the vapors are condensed by a surface condenser or in other words that the vapors from the blow pit are condensed by bringing them into contact with a chilled solid surface. In this way the only water which can absorb the sulfur dioxid is that which has been condensed from the steam which comes from the blow pit, and consequently this water may be brought out so near the boiling point that it contains the minimum amount of the gas. Consequently the greater volume of unconfined gas will not be absorbed by the water but will pass into the absorber at 17. Furthermore by the employment of a surface condenser, the water, which is used as the cooling medium and which is delivered from the condenser in a clean heated condition, may be utilized for a variety of purposes for which it could not be used if it had been previously employed in the direct condensation of the vapors by contact therewith, because in the latter case it would have absorbed a portion of the sulfur dioxid. Preferably therefore the water of condensation is maintained at a temperature but slightly less than the boiling point so as to limit the absorption thereby of the free $SO_2$.

It will be understood from the foregoing description, that the instrumentalities for carrying out the process are illustrated diagrammatically on the drawing, and no attempt has been made to show them in their relative proportions or to show them in detail, as their details of construction may be varied as circumstance and convenience dictate.

Having thus explained the nature of our said invention and described a way of constructing and using the same, although without attempting to set forth all of the forms in which it may be made or all of the modes of its use, what we claim is:

1. The combination with a digester, a blow pit, and a stack communicating with the blow pit to receive the vapors and gases therefrom, of a surface condenser communicating with said stack for condensing the watery vapors, whereby the absorption of the free gases is limited to that by the products of condensation, means for receiving the uncondensed gases, and means for collecting the products of condensation.

2. The herein described process of recovering sulfur dioxid, which consists in discharging the contents of a digester into a blow pit which is maintained at not more than substantially atmospheric pressure, separating and recovering the pulp, condensing the vapors without the addition of water thereto, whereby the absorption of the sulfur dioxid is limited to that by the liquid products of condensation, conducting away separately the liquid product of condensation, and recovering the remaining sulfur dioxid.

In testimony whereof we have affixed our signatures, in presence of two witnesses.

HUGH K. MOORE.
ROBERT B. WOLF.

Witnesses:
JAMES E. MURRINER,
FRANK J. GRAY.